United States Patent [19]

Skrypek et al.

[11] 4,351,610
[45] Sep. 28, 1982

[54] PHOTOCOMPOSER

[75] Inventors: John P. Skrypek, Mahwah; Robert Williams, Randolph; Enn Sirvet, Washington Township, Bergen County, all of N.J.

[73] Assignee: Sun Chemical Corporation, New York, N.Y.

[21] Appl. No.: 152,990

[22] Filed: May 27, 1980

[51] Int. Cl.³ .............................................. G03B 27/04
[52] U.S. Cl. ........................................ 355/86; 355/95
[58] Field of Search ................ 355/86, 87, 95, 96, 355/53

[56] References Cited

U.S. PATENT DOCUMENTS

| | | | |
|---|---|---|---|
| 1,465,283 | 8/1923 | Ogden | 355/86 |
| 1,604,083 | 10/1926 | Smothers | 355/86 |
| 1,647,246 | 11/1927 | Ogden | 355/86 |
| 1,686,559 | 10/1928 | Harris | 355/86 |
| 2,290,292 | 7/1942 | Neu | 355/95 |
| 3,126,807 | 3/1964 | Bragg et al. | 355/87 |
| 3,635,138 | 1/1972 | Mabry | 355/86 |
| 3,639,059 | 2/1972 | Strumor et al. | 355/86 |

FOREIGN PATENT DOCUMENTS 784066 10/1957 United Kingdom ................ 355/86

Primary Examiner—Monroe H. Hayes
Attorney, Agent, or Firm—Cynthia Berlow

[57] ABSTRACT

A photocomposer includes a fixed rearwardly inclined backboard for supporting a sensitized lithographic plate. To substantially reduce the weight of the backboard and its supporting structure, the main portion of the backboard is of cellular construction. Depressible register pins for positioning the lithographic plate are mounted on the backboard. Each pin is part of an assembly constructed to readily permit transverse adjustment of the pins.

9 Claims, 9 Drawing Figures

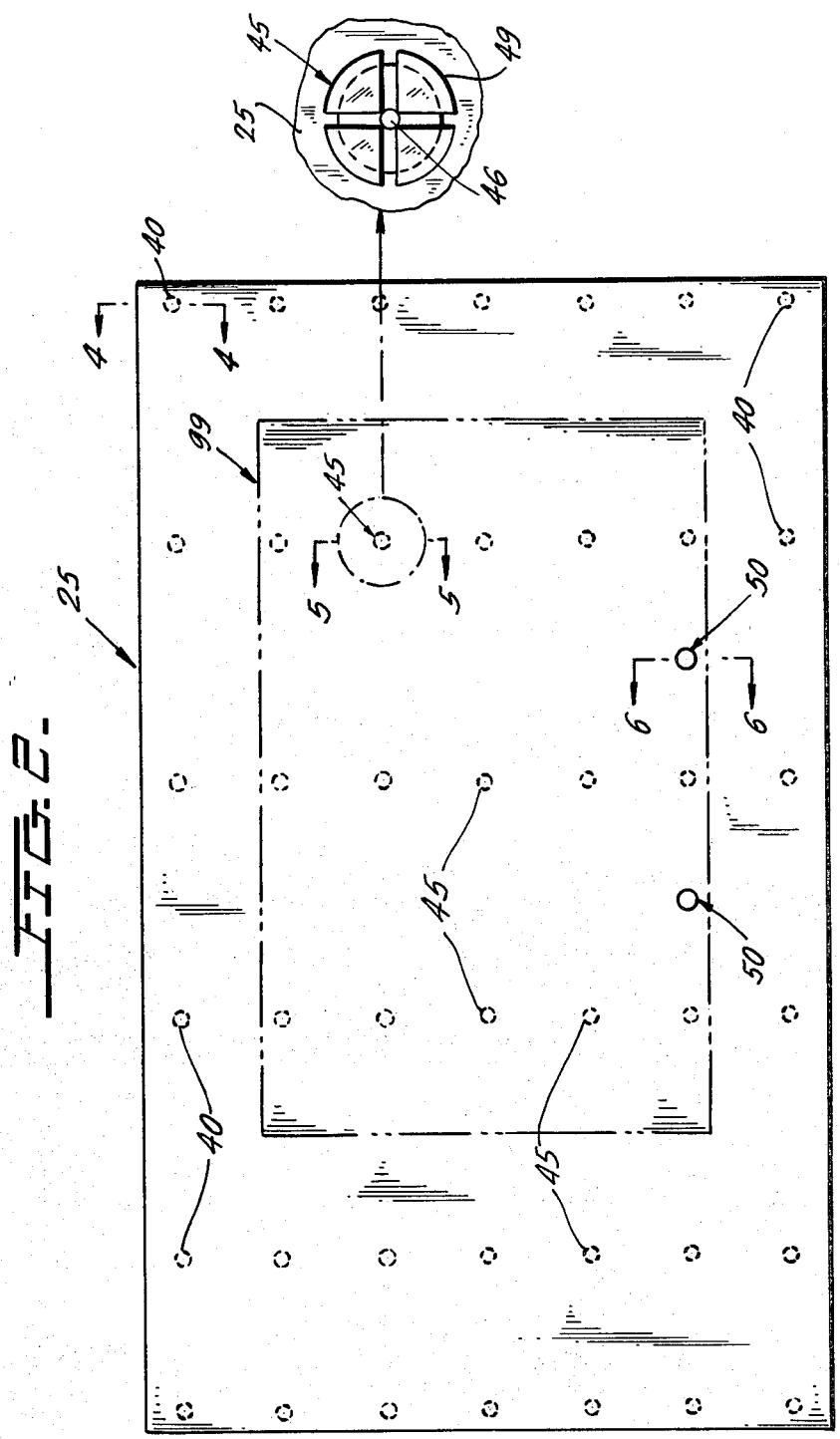

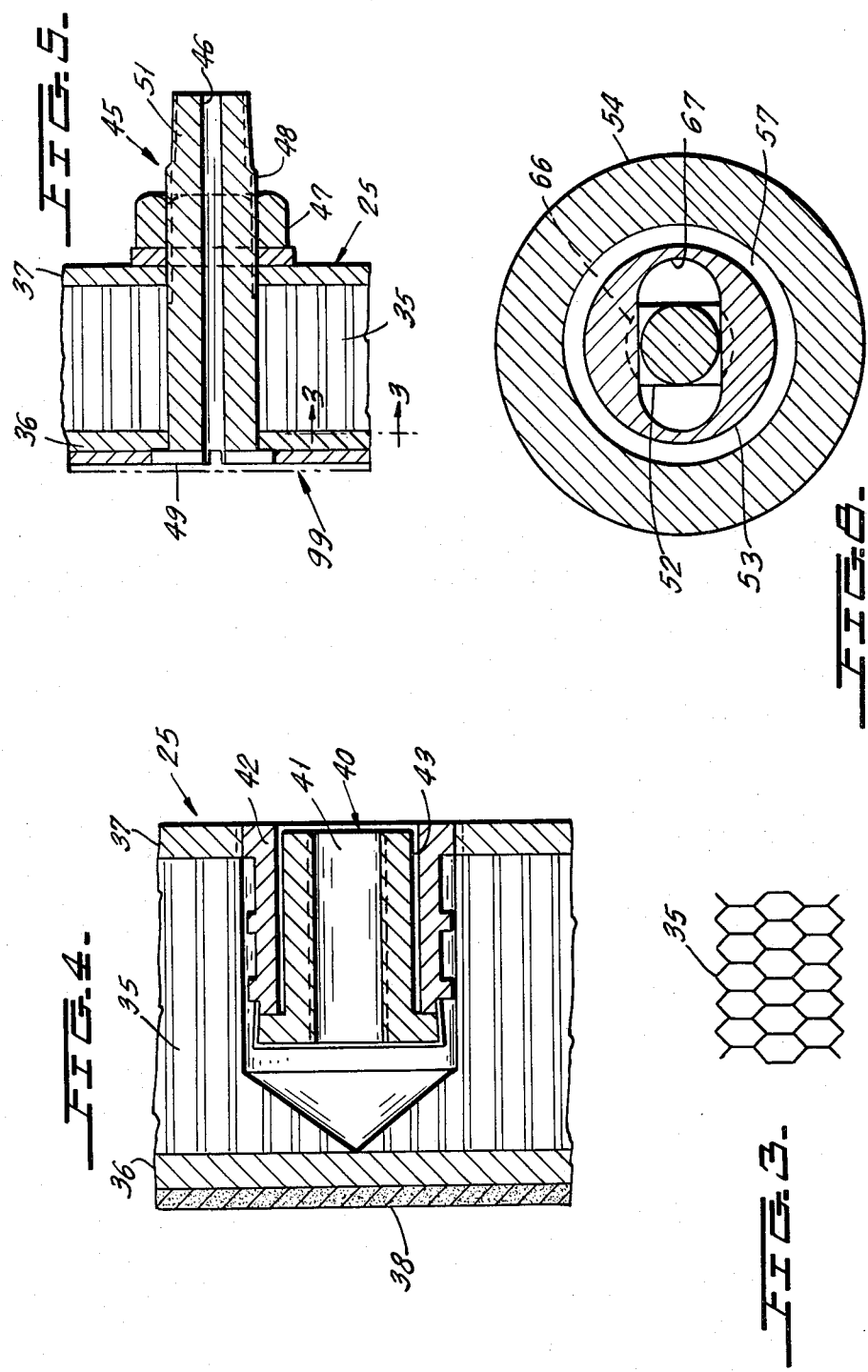

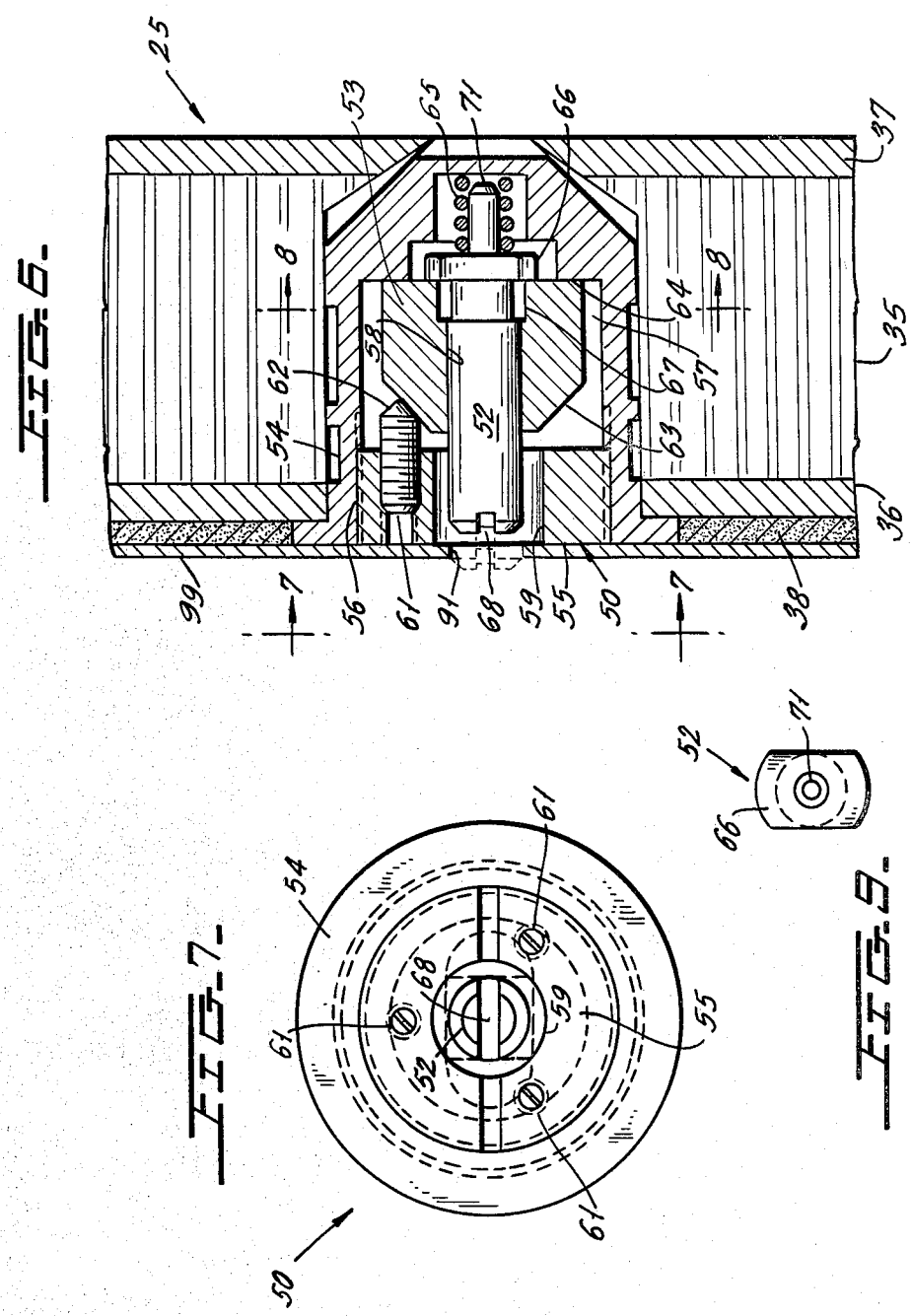

PHOTOCOMPOSER

Printing plates having composite images for lithography and the like are often produced by a photographic process utilizing apparatus referred to as a photocomposer. Such apparatus utilizes a sensitized plate mounted on a backboard associated with a negative holder and a high intensity light source. The negative holder and light source are movable with extreme accuracy to selected locations confronting the sensitized plate. When the negative holder and light source are stopped at a selected location, the light source is actuated to generate a beam which, after passing through the film, impinges upon the sensitized plate. After the desired exposure of the plate has taken place, the latter is processed chemically to produce a printing plate.

This general type of photocomposing apparatus is described in U.S. Pat. No. 3,639,059 issued Feb. 1, 1972, to M. A. Strumor et al. for Graphic-Processing Apparatus. The apparatus of said U.S. Pat. No. 3,639,059 includes a support or backboard on which the lithographic plate is secured. This backboard is moved to a horizontal position for mounting and dismounting of the lithographic plate and is tilted to a vertical position where it remains while the sensitized plate is being exposed to light. Since the backboard is relatively large, often being seven feet high by fourteen feet wide, this tilting arrangement between horizontal and vertical positions requires a large amount of floor space as well as a high ceiling.

In another prior art photocomposer the backboard is always vertical but is moved horizontally to position the sensitized plate relative to the negative holder and light source.

In order to reduce the amount of floor space required for a photocomposer, the instant invention constructs the photocomposer so that the front or main surface thereof is inclined rearwardly at an angle of approximately 30° with respect to the vertical and remains in the same position while the sensitized plate is being exposed as well as while the plate is being loaded and unloaded.

In order to maintain extreme accuracy, it is necessary that all portions of the photocomposer, including the backboard, be extremely rigid. Thus, in the prior art the large backboard was very heavy and required a very heavy supporting frame. In order to substantially reduce the weight of the photocomposer and of the backboard in particular, the instant invention provides a backboard having a main section formed as a honeycomb sandwiched between thin aluminum plates or skins. This construction reduces the weight of a seven foot by fourteen foot backboard by approximately 400 pounds as compared to a typical prior art backboard.

Initial positioning of the sensitized plate on the backboard is accomplished by utilizing register pins and/or suction to hold the sensitized plate in operative position while it is being taped to the front of the backboard. Pursuant to the instant invention, each of the register pins is depressible to a retractable position so as not to interfere with positioning of the negative holder. Each register pin is part of an assembly which is constructed to facilitate positioning of the register pin transverse to the backboard and also facilitates retracting and projecting of each register pin.

Accordingly, a primary object of the instant invention is to provide improved photocomposer apparatus.

Another object is to provide a photocomposer having a large and relatively lightweight backboard.

Still another object is to provide a photocomposer which requires less floor space and ceiling height than is required by prior art photocomposers having backboards of similar size.

A further object is to provide a photocomposer of this type having novel retractable register pins for positioning a lithographic plate prior to securement of the latter to the backboard.

A still further object is to provide a photocomposer of this type having novel adjustable registration pin means.

These objects as well as other objects of this invention shall become readily apparent after reading the following description of the accompanying drawings in which:

FIG. 2 is a front elevation of the backboard looking in the direction of arrows 2—2 of FIG. 1.

FIG. 3 is a fragmentary cross-section taken through line 3—3 of FIG. 5 looking in the direction of arrows 3—3.

FIG. 4 is a cross-section taken through line 4—4 of FIG. 2 looking in the direction of arrows 4—4 and illustrating an insert for fastening the backboard to a support frame.

FIG. 5 is a cross-section taken through line 5—5 of FIG. 2 looking in the direction of arrows 5—5 and illustrating one of the fittings for supplying suction holding forces to secure a sensitized plate to the backboard.

FIG. 6 is a cross-section taken through line 6—6 of FIG. 2 looking in the direction of arrows 6—6 and illustrating one of the register pin assemblies.

FIG. 7 is a front elevation of the register pin assembly looking in the direction of arrows 7—7 of FIG. 6.

FIG. 8 is a cross-section of the register pin assembly taken through line 8—8 of FIG. 6 and looking in the direction of arrows 8—8.

FIG. 9 is an end view of the register pin looking toward the rear thereof.

Figure 1:
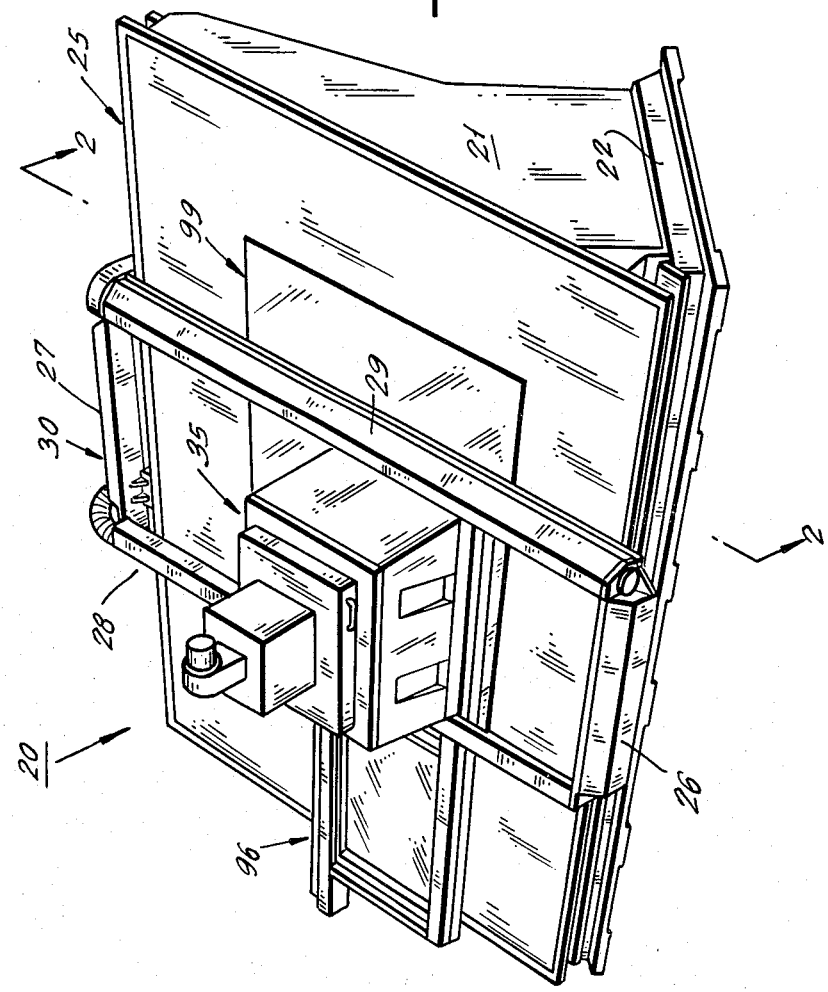
FIG. 1 is a perspective of a portion of photocomposer apparatus constructed pursuant to the instant invention.

Now referring to the Figures. Photocomposer 20 includes hollow main frame 21 having base 22 which rests on a horizontal surface supporting photocomposer 20. Fixedly secured to main frame 21 is rearwardly inclined backboard 25 which is approximately fourteen feet long by seven feet high and one and a quarter inches thick. The inclination of backboard 25 with respect to the vertical is within the range of 10° to 40° and is preferably approximately 30°. Disposed immediately in front of backboard 25 are the long elements of rectangular auxiliary frame 30. The opposite ends of elements 28, 29 are connected by horizontal auxiliary frame elements 26, 27 which are parallel to and are disposed in the vicinity of the long horizontal edges of backboard 25. Extensions (not shown) of auxiliary frame elements 26, 27 project rearward and are engaged by lead screw means (not shown) disposed behind backboard 25 for moving frame 30 horizontally with respect to main frame 21.

Auxiliary frame 30 supports double drawer film storage device 96 and light means-film carrier unit 34. In a manner well-known to the art, film is transferred between storage means 96 and unit 34. Additional lead screw means (not shown) disposed behind auxiliary frame elements 28, 29 are in operative engagement with means 96 and unit 34 to control movement of unit 34 and storage means 96 parallel to the front surface of backboard 25 and parallel to long auxiliary frame elements 28, 29. The aforesaid U.S. Pat. No. 3,639,059 describes utilization of lead screw means to accurately position a projection head with respect to a backboard.

As seen in FIGS. 3 through 6, backboard 25 is constructed of cellular main section 35 sandwiched between thin aluminum skins 36, 37. The latter are cemented to opposite surfaces of main section 35. Thin linoleum sheet 38 is cemented to the front surface of aluminum sheet 36 which forms the front skin for main section 35. A preferred form for the cellular shape of main section 35 is the honeycomb form shown in FIG. 3. This shape results in a rigid lightweight structure.

A plurality of inserts 40 (FIG. 4) enterable at the rear of backboard 25 are provided for mounting of backboard 25 to main frame 21. Each insert 40 includes inner element 41 having a threaded bore and outer element 42 which is cemented in fixed position within a depression at the rear of backboard 25. Clearance 43 between elements 41 and 42 permits transverse adjustment of the former to facilitate alignment with appropriate apertures (not shown) in main frame 21.

Extending through apertures in backboard 25 are a plurality of fittings 45 (FIG. 5), each having a longitudinal passage 46 through which suction is applied at the front of backboard 25 for holding sensitized plate 99 flush against the front surface of backboard 25. Nut 47 engages threaded formation 48 at the rear of backboard 25 to secure fitting 45 in operative position. Enlarged head 49 at the front of fitting 45 limits rearward movement of the latter as nut 47 is being tightened. Portion 51 extending to the rear of nut 47 is intended for connection of a hose (not shown) which extends to a low pressure source.

A plurality of registration pin assemblies 50 are secured to backboard 25 for the purpose of positioning and supporting sensitized plate 99 before the application of suction through fittings 45 and prior to taping plate 99 to backboard 25. As seen best in FIG. 6, assembly 50 comprises register pin 52, pin retainer 53, insert 54, and support 55, coiled compression spring 65 and three set screws 61. Insert 54 is disposed within a recess open at the front of backboard 25 with the front surface of insert 54 being flush with the front surface of skin 38. Support 55 is mounted to insert 54 by thread means 56 and is disposed at the front end of recess 57 in insert 54. Retainer 53 is also disposed within recess 57, being positioned to the rear of support 55.

Retainer 53 is provided with relatively close fitting guide aperture 58 through which the front main section of pin 52 is movable. The latter is also movable through clearance aperture 59 in support 55 and register aperture 91 in plate 99 (FIG. 6). Chamber 57 is substantially larger in diameter than is retainer 53 and clearance aperture 59 is substantially larger in diameter than is the front section of pin 52. This permits limited transverse movement of retainer 53 relative to insert 54 for transverse adjustment of register pin 52 carried by retainer 53. Set screws 61 are threadably mounted to support 55 and arranged in a circular array about clearance aperture 59. The rear of each screw 61 is provided with conical tip 62 which bears against conical surface 63 at the front of retainer 53 to lock retainer 53 in its adjusted position. That is, the rear surface of retainer 53 is clamped against internal surface 64 of insert 54 by rearwardly directed forces exerted on retainer 53 as set screws 61 are tightened.

Spring 65 encircles the reduced diameter rearward extension 71 of register pin 52 and biases pin 52 in a forward direction toward its extended working position (dotted line position shown in FIG. 6) projecting forward of backboard 25. The front of spring 65 bears against transverse projecting formation 66 of pin 52 which is proportioned to be received by rear depression 67 of retainer 53, but only when a predetermined angular relationship exists between pin 52 and retainer 53. When this relationship exists, spring 65 moves pin 52 to its extended working position. To move pin 52 to its retracted position shown in FIG. 6, a screwdriver is inserted into slot 68 at the front end of pin 52 and a rearward directed force is exerted on pin 52. When formation 66 moves to the rear of retainer 53, pin 52 is pivoted 90° so that projecting formation 66 is in the position shown in FIGS. 6 and 8, and upon release of pin 52 the forwardly directed force exerted by sring 65 will not be effective to project pin 52 forward of backboard 25.

When lithographic plate 99 is to be mounted to the backboard 25, register pins 52 are extended to their working positions where they will support plate 99 by protruding through aperture 91 of plate 99. Suction will then be applied to at least some of those fittings 45 which are covered by plate 99 and the edges of plate 99 will be taped to backboard 25. Thereafter, register pins 52 will be retracted and the stepped positioning of negative holder 96 and lamp housing unit 36 commences and proceeds until all preselected areas of plate 99 have been exposed.

Although a preferred embodiment of this invention has been described, many variations and modifications will now be apparent to those skilled in the art, and it is therefore preferred that the instant invention be limited not by the specific disclosure herein, but only by the appending claims.

What is claimed is:

1. Photocomposing apparatus including a backboard for receiving a sensitized plate; a light means and film carrier unit disposed in front of said backboard and mounted for relative movement with respect to said backboard with such movement being generally parallel to the front of said backboard to positions wherein said unit confronts selected portions of said backboard; adjustable registration pin means on said backboard for locating a sensitized plate thereon in a predetermined position thereon; said registration means including a plurality of pin assemblies each of which includes a registration pin and mounting means to which said pin is mounted for movement between an extended working position projecting forward of said backboard and a retracted position wherein the forward free end of said pin is disposed behind the front surface of backboard, said mounting means including an insert, a retainer and a support; said insert being fixedly secured to said backboard and disposed behind the front surface thereof; said insert having a chamber extending to the front thereof; said support being mounted to said insert and being disposed within said chamber at the front thereof; said retainer being disposed within said chamber to the rear of said support and being transversely adjustable with respect to said insert; said retainer having a front to rear guide aperture closely fitted to said pin and through which the latter extends; said support having a clearance aperture loosely fitted to said pin and through which the latter extends when in said working position; clamping means mounted on said support and operable from the front of said backboard; said clamping means being operatively engageable with said retainer to maintain the latter in its adjusted transverse position relative to said insert; with said retainer in its said adjusted transverse position relative to said insert said pin being in optimum position to be received by a register aperture in a sensitized plate.

2. Photocomposing apparatus as set forth in claim 1 in which the clamping means includes a plurality of front to rear set screws disposed around the clearance aperture; each of said set screws having a conical formation at the rear thereof which operatively engages a cooperating conical surface at the front of the retainer to drive the retainer rearward against a clamping formation of said insert.

3. Photocomposing apparatus as set forth in claim 2 in which each of the pin assemblies also includes a biasing means urging said pin forward toward its said working position; first cooperating formations on said mounting means and said pin to limit forward movement of the latter to its said working position; second cooperating formations on said mounting means and said pin to hold the latter in its said retracted position.

4. Photocomposing apparatus as set forth in claim 3 in which the first and second cooperating formations function when the pin is in respective first and second angular positions.

5. Photocomposing apparatus as set forth in claim 4 in which the pin is operable between said first and second angular positions by tool means operable at the front of the backboard.

6. Photocomposing apparatus as set forth in claim 1 in which said backboard includes front skin means, rear skin means and a main section sandwiched between said front and rear skin means; said main section being of cellular construction and being substantially thicker than the combined thicknesses of said front and rear skin means.

7. Photocomposing apparatus as set forth in claim 6 in which the cellular construction is honeycomb-like.

8. Photocomposing apparatus as set forth in claims 6 or 7 in which the cellular construction includes a plurality of elongated cells positioned side by side; each of said cells extending through said main section from front to rear thereof.

9. Photocomposing apparatus as set forth in claim 1 in which the baseboard includes front skin means, rear skin means and a main section sandwiched between said front and rear skin means; said main section being of cellular construction and being substantially thicker than the combined thicknesses of said front and rear skin means.

* * * * *

UNITED STATES PATENT OFFICE
CERTIFICATE OF CORRECTION

PATENT NO. : 4,351,610

DATED : September 28, 1982

INVENTOR(S) : John P. Skrypek, Robert Williams, Enn Sirvet, and Michael Turturro It is certified that error appears in the above-identified patent and that said Letters Patent are hereby corrected as shown below:

Title page, left column, item (75), line 4, after "N.J." insert --; and Michael Turturro, Spring Valley, N.Y.--

Signed and Sealed this

Thirtieth Day of November 1982

[SEAL]

Attest:

GERALD J. MOSSINGHOFF

Attesting Officer   Commissioner of Patents and Trademarks